United States Patent
Shimotoyodome et al.

[11] Patent Number: 5,908,056
[45] Date of Patent: Jun. 1, 1999

[54] LIQUID CRYSTAL DELIVERING APPARATUS

[75] Inventors: Gyo Shimotoyodome; Isao Sugiura, both of Tokyo, Japan

[73] Assignee: Beldex Corporation, Tokyo, Japan

[21] Appl. No.: 09/088,482

[22] Filed: Jun. 2, 1998

Related U.S. Application Data

[62] Division of application No. 08/674,745, Jul. 2, 1996, Pat. No. 5,803,137.

[30] Foreign Application Priority Data

| Jul. 24, 1995 | [JP] | Japan | 7-208373 |
| Jul. 24, 1995 | [JP] | Japan | 7-208374 |
| Nov. 29, 1995 | [JP] | Japan | 7-334045 |

[51] Int. Cl.$^6$ ................................................. B65B 1/08
[52] U.S. Cl. ........................... 141/67; 141/47; 141/66
[58] Field of Search ................................ 141/4–8, 47–49, 141/66, 67, 114; 222/213, 215

[56] References Cited

U.S. PATENT DOCUMENTS 4,941,518   7/1990   Williams et al. ........................ 141/7

*Primary Examiner*—David J. Walczak
*Assistant Examiner*—Timothy L. Maust
*Attorney, Agent, or Firm*—Fish & Richardson P. C.

[57] ABSTRACT

An internal space of a closed container is divided into a first chamber and a second chamber by a deformable partition member. The first chamber is provided as a chamber for reserving a liquid crystal and connected to an object through a first port of the closed container. The second chamber receives a pressurized fluid from a pressurized fluid supply source through a second port of the closed container. The liquid crystal within the first chamber is pressurized through the partition member by a pressurized fluid which is introduced into the second chamber and the liquid crystal is delivered to the object.

4 Claims, 6 Drawing Sheets

Fig.12

LIQUID CRYSTAL DELIVERING APPARATUS

This is a divisional of U.S. application Ser. No. 08/674,745, filed Jul. 2, 1996, now U.S. Pat. No. 5,803,137 (allowed).

BACKGROUND OF THE INVENTION

This invention relates to an apparatus for delivering a liquid crystal to an object.

Japanese Patent Application Laid-Open No. 37529/1989 discloses an apparatus for delivering a liquid crystal to a cell (object) in order to manufacture a liquid crystal display unit. This apparatus includes a closed container for reserving a liquid crystal. The closed container is formed with a first port and a second port. When a compressed inert gas from a tank is supplied to an upper space of the closed container via the second port, the liquid crystal reserved in the closed container is pushed out of the first port by this compressed gas and delivered to the cell.

In the above apparatus, since the compressed gas contacts directly the liquid crystal within the closed container, a gas is likely to be mixed into the liquid crystal although such a gas is very small in quantity. The gas thus mixed into the liquid crystal becomes a foam or gas-bubble within the cell and degrades the quality of the liquid crystal apparatus.

SUMMARY OF THE INVENTION

It is, therefore, an object of the present invention to provide a liquid crystal delivering apparatus capable of minimizing the possibility of mixing of a gas into a liquid crystal when the liquid crystal is being delivered.

According to the present invention, there is provided a A liquid crystal delivering apparatus comprising:

(a) a closed container provided with a first port and a second port, the first port being connected to an object to which a liquid crystal is to be delivered;

(b) a pressurized fluid supply source connected to the second port; and (c) a deformable partition member for dividing an internal space of the closed container into a first chamber and a second chamber, the first chamber being provided as a chamber for reserving the liquid crystal and in communication with the first port, the second chamber being in communication with the second port and provided as a chamber for receiving a pressurized fluid from the pressurized fluid supply source.

DETAILED DESCRIPTION OF THE EMBODIMENTS

The first embodiment of a liquid crystal delivering apparatus according to the present invention will now be described with reference to FIGS. 1 through 4.

Figure 1:
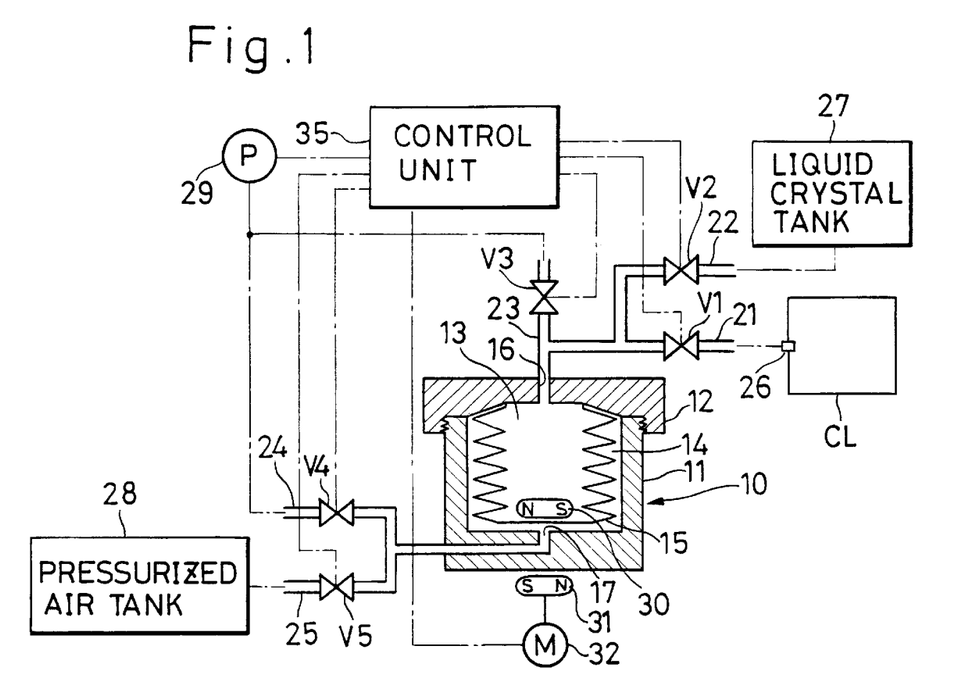
FIG. 1 is a sectional view of the first embodiment of a liquid crystal delivering apparatus according to the present invention, showing an initial state.

As shown in FIG. 1, the liquid crystal delivering apparatus includes, as chief component elements, a closed container 10 and a bellows 15 (bag-like deformable partition member). The closed container 10 includes a container body 11 and a closure 12 threadingly engaged with the container body 11 in such a manner as to close an upper end opening thereof in an air-tight manner. The closure 12 constitutes an upper wall of the closed container 10.

The bellows 15 is received in the closed container 10 and expanded in its natural posture. The bellows 15 is vertically expansible and contractible. A bottom wall of the bellows 15 is flat and an upper end of the bellows 15 is secured to a lower surface of the closure 12 of the closed container 10 in an air-tight manner. An internal space of the closed container 10 is divided by the bellows 15 into an inner space 13 (first chamber) and an outer space 14 (second chamber) both with respect to the bellows 15.

Received in the inner space 13 is a liquid crystal as later described. For this reason, the bellows 15 is made of such a chemically stable material as a fluororesin or the like with respect to the liquid crystal. It is preferred that the closure 12 is also made of fluororesin or the lower surface of the closure 12 is coated with fluororesin.

The closure 12 is formed with a first port 16 which is in communication with the inner space 13. A bottom wall of the container body 11 is formed with a second port 17 which is in communication with the outer space 14. This second port 17 may be formed on a peripheral wall of the container body 11.

The first port 16 is connected with one ends of an outlet tube 21 provided with a valve V1, a supply tube 22 provided with a valve V2, and an intake tube 23 provided with a valve V3. The second port 17 is connected with one ends of an intake tube 24 provided with a valve V4 and an inlet tube 25 provided with a valve V5.

The other end of the outlet tube 21 is provided with a connector 26 which is to be connected to a charge port of a liquid crystal cell CL (object). The other end of the supply tube 22 is connected with a liquid crystal tank 27 (liquid crystal supply source). The other end of the inlet tube 25 is connected with a pressurized air tank 28 (pressurized fluid supply source). The other ends of the intake tubes 23 and 24 are connected with a vacuum pump 29 (evacuation means).

The intake tubes 23 and 24 are provided with a liquid crystal trap and a filter (none of them is shown).

An agitator 30 constituted of a permanent magnet is received in the bellows 15. This agitator 30 is placed on a bottom wall of the bellows 15. A rotor constituted of another permanent magnet is arranged under and in the vicinity of a bottom wall of the closed container 10. This rotor 31 is rotated by a motor 32.

The valves V1 through V5, the pump 29, the motor 32, etc. are controlled by a control unit 35. In order to simplify the illustration, the control unit 35 is shown only in FIG. 1 and not shown in FIGS. 2 through 4.

Operation of the liquid crystal delivering apparatus thus constructed will now be described. In all the processes to be described hereinafter, the vacuum pump 29 is maintained in its driving state. In an initial state shown in FIG. 1, the valves V1 through V5 are all in their closed positions. The bellows 15 is expanded in its natural state where inner and outer pressures thereof are identical with each other.

Figure 2:
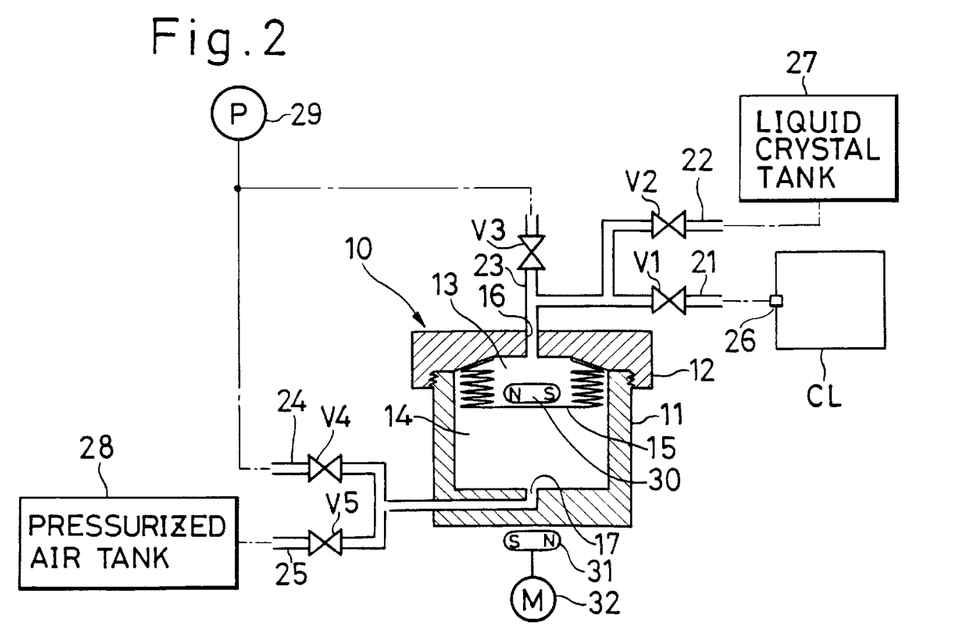
FIG. 2 is a view corresponding to FIG. 1, but showing the state in which a preparatory process for receiving the supply of a liquid crystal is being executed by the above apparatus.

First, a preparatory process is executed. Specifically, the valve V3 is opened to evacuate the inner space 13. Consequently, as shown in FIG. 2, the bellows 15 is contracted. The intake tube 23 is, of course, evacuated. In addition, the passages from the first port 16 to the valves V1 and V2 in the outlet tube 21 and in the supply tube 22 are also evacuated. At that time, it is preferred that the valve V5 is opened to supply a pressurized air to the outer space 14 in order to facilitate the contraction of the bellows 15.

Figure 3:
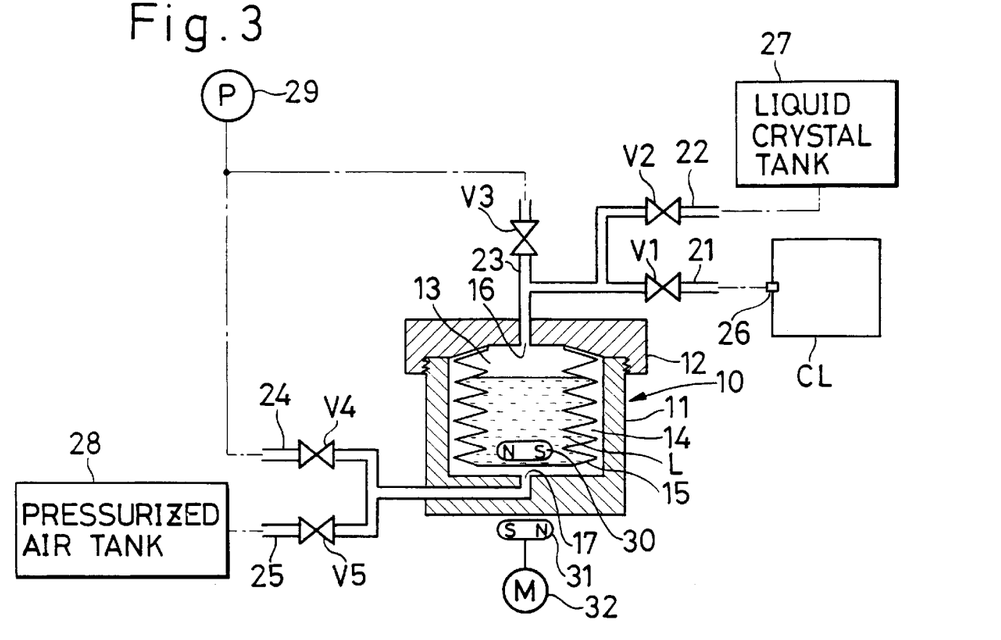
FIG. 3 is a view corresponding to FIG. 1, but showing the state in which a process for removing a gas from the liquid crystal is being executed by the above apparatus.

Subsequently, a liquid crystal supply process is executed. Specifically, after the valves V3 and V5 are closed, the valve V2 is opened. Consequently, as shown in FIG. 3, a liquid crystal L is supplied into the bellows 15 from the liquid crystal tank 27 via the supply tube 22 and the first port 16. At that time, it is preferred that the valve V4 is also opened to evacuate the outer space 14, so that the bellows 15 are expanded to more rapidly receive the supply of the liquid crystal L.

Subsequently, a process for removing a gas from the liquid crystal is executed. Specifically, after the valves V2 and V4 are closed, the valves V3 and V4 are opened. By doing this, both the inner and outer spaces 13 and 14 are evacuated. As a consequence, there becomes no difference in pressure between the inside and the outside of the bellows 15 and the bellows 15 is maintained in its expanded state by gravity of the liquid crystal L. In that state, the motor 32 is driven to rotate the rotor 31 to thereby rotate the agitator 32, so that the liquid crystal L received in the bellows 15 is agitated. By this agitation and evacuation through the intake tube 23, the gas mixed into the liquid crystal L is removed from the liquid crystal L.

Figure 4:
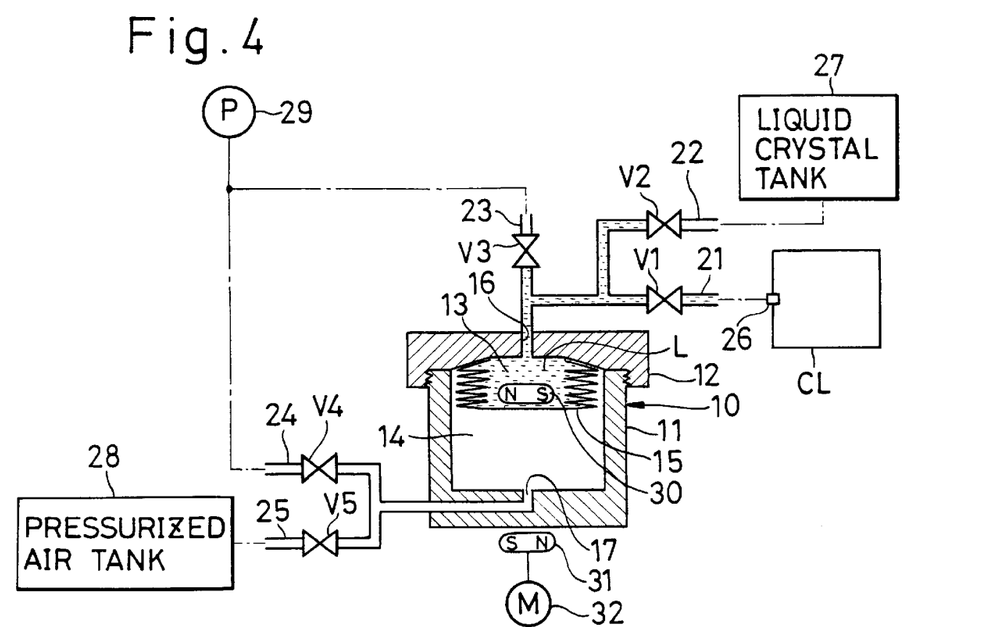
FIG. 4 is a view corresponding to FIG. 1, but showing the state in which a process for delivering a liquid crystal is being executed by the above apparatus.

Subsequently, a liquid crystal delivering process is executed. Specifically, the valves V3 and V4 are closed and the valve V5 is opened to supply a pressurized air into the outer space 14. Simultaneously or with a slight delay of time, the valve V1 is opened. As a consequence, the bellows 15 is contracted and the liquid crystal L within the bellows 15 is delivered to the cell CL via the outlet tube 21 and the connector 26. In the cell CL, the pressurized liquid crystal L is charged from the charge port which is connected with the connector 26 and evacuated from an intake port which is formed on an opposite side of the charge port. As a consequence, the liquid crystal L is filled in the internal space of the cell CL.

In the liquid crystal delivering process, the pressurized air is isolated by the bellows 15 and not in contact with the liquid crystal L. Accordingly, it can be prevented that the pressurized air is mixed into the liquid crystal L. Once the gas contained in the liquid crystal L is removed, it is no more required to remove gas from the liquid crystal L and therefore, working efficiency is enhanced. Moreover, since the bellows 15 is contracted by pressurized air, resiliency of this pressurized air can bear the role for suppressing the fluctuation of the pressure for delivering the liquid crystal L. In addition, since air is used as a fluid for pressurizing the bellows, operating cost can be reduced.

When the liquid crystal delivering process is finished, the valves V1 through V5 are all closed. When a new cell CL is connected to the connector 26, the valves V1 and V5 are opened again to execute the liquid crystal delivering process in the same manner as mentioned above. When the bellows 15 is contracted to its limit thus making it unable to deliver the liquid crystal L, the liquid crystal supply process, the process for removing a gas from the liquid crystal and the liquid crystal delivering process are executed.

In the first embodiment, it acceptable that the first port 16 is connected only with the outlet tube 21, and the supply tube 22 and the intake tube 23 are connected respectively to two separate ports which are formed in the closure 12. It is likewise acceptable that the second port 17 is connected only with the inlet tube 25, and the intake tube 24 is connected to another port which is formed in the container body 11.

In the first embodiment, the supply tube 22 and the liquid crystal tank 27 may be omitted. In that case, a hole is formed in the closure 12 and this hole is closed by a closing member in an air-tight manner. When the liquid crystal in the bellows becomes short, the closing member is removed to supply the liquid crystal to the bellows 15 from the hole of the closure 12. The closing member is preferred to serve also as a joint for the tubes 21 and 23.

Other embodiment of the present invention will now be described. In those embodiments, corresponding component parts to those of the preceding embodiment are denoted by identical reference numerals and detailed description thereof is omitted.

Figure 5:
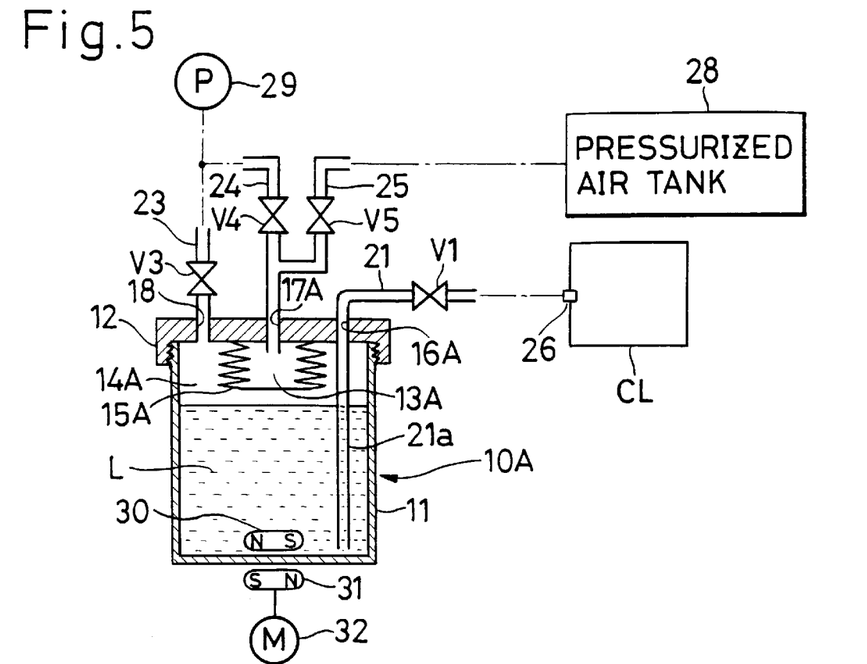
FIG. 5 is a sectional view of the second embodiment of a liquid crystal delivering apparatus according to the present invention, showing the state in which a gas removing process is being executed.
Figure 6:
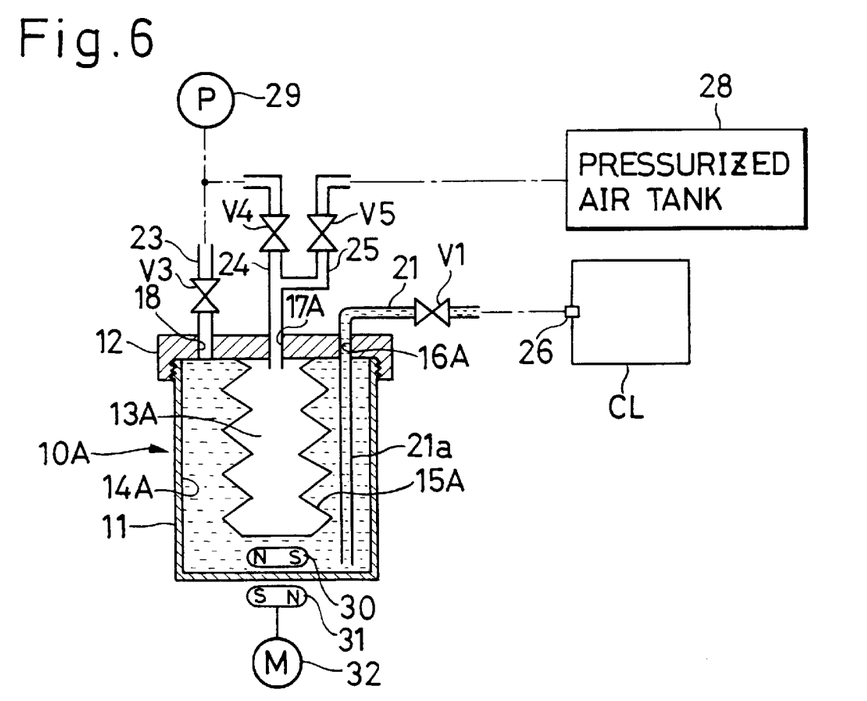
FIG. 6 is a view corresponding to FIG. 5, but showing the state in which a process for delivering a liquid crystal is being executed by the above apparatus.

FIGS. 5 and 6 show the second embodiment of the present invention. Constructions of a closed container 10A and a bellows 15A according to this second embodiment are basically the same as the closed container 10 and the bellows 15 of the first embodiment. They are different from the first embodiment in the respect that the bellows 15A is contracted in its natural state, the outer space 14A is served as the first chamber for reserving the liquid crystal L, the inner space 13A is served as the second chamber for introducing a pressurized air, and the agitator 30 is received in the outer space 14A and placed on the bottom wall of the container body 11.

Specifically, the closure 12 is formed with a first port 16A, a second port 17A and a third port 18. The first and third ports 16A and 18 are in communication with the outer space 14A, and the second port 17A is in communication with the inner space 13A.

The first port 16A is connected with the connector 26 through the outlet tube 21. This outlet tube 21 has an extension portion 21a vertically extending through the outer space 14A in the closed container 10. A lower end of this extension portion 21a is located in the vicinity of a bottom wall of the container body 11. The second port 17A is connected with the pressurized air tank 28 through the inlet tube 25 and also with the vacuum pump 29 through the intake tube 24. The third port 18 is connected with the vacuum pump 29 through the intake tube 23.

With the above construction, first, the closure 12 is detached to supply the liquid crystal L into the container body 11. Then the closure 12 is attached to the container body 11 in an air-tight manner to create the state as shown in FIG. 5. In that state, the process for removing a gas from the liquid crystal is executed. Specifically, the valves V3 and V4 are opened and the motor 32 is driven to thereby agitate the liquid crystal, while allowing the remaining valves V1 and V5 in their closed positions. Owing to this arrangement, the gas mixed into the liquid crystal L is discharged from the vacuum pump 29 via the third port 18 and the intake tube 23. At that time, since the interior of the bellows 15A is also evacuated, there is no difference in pressure between the inside and the outside of the bellows 15A. Therefore, the bellows 15A is maintained in its contracted state and away from the liquid crystal L. As a consequence, agitation of the liquid crystal L is performed in a favorable fashion, and foam generated within the liquid crystal L is prevented from adhering to the bellows 15A.

After the process for removing a gas from the liquid crystal is executed, the liquid crystal delivering process is executed as shown in FIG. 6. Specifically, the valves V3 and V4 are closed and the valves V1 and V5 are opened. By doing this, a pressurized air from the pressurized air tank 28 is supplied to the inner space 13A via the inlet tube 25. As a consequence, the bellows 15A is expanded and the liquid crystal L is supplied to the cell CL from the outlet tube 21 by being pushed by the bellows 15A.

In the liquid crystal delivering process, the valve V3 may be opened until the liquid crystal L reaches the lower surface of the closure 12 of the closed container 10. By doing this, even if a thin air is remained at an upper part of the outer space 14A, it can assuredly be removed.

The valve V1 may be belatedly be opened after the valve V5 is opened. If so, the liquid crystal L is supplied to the cell CL after it reached a predetermined pressure level.

Figure 7:
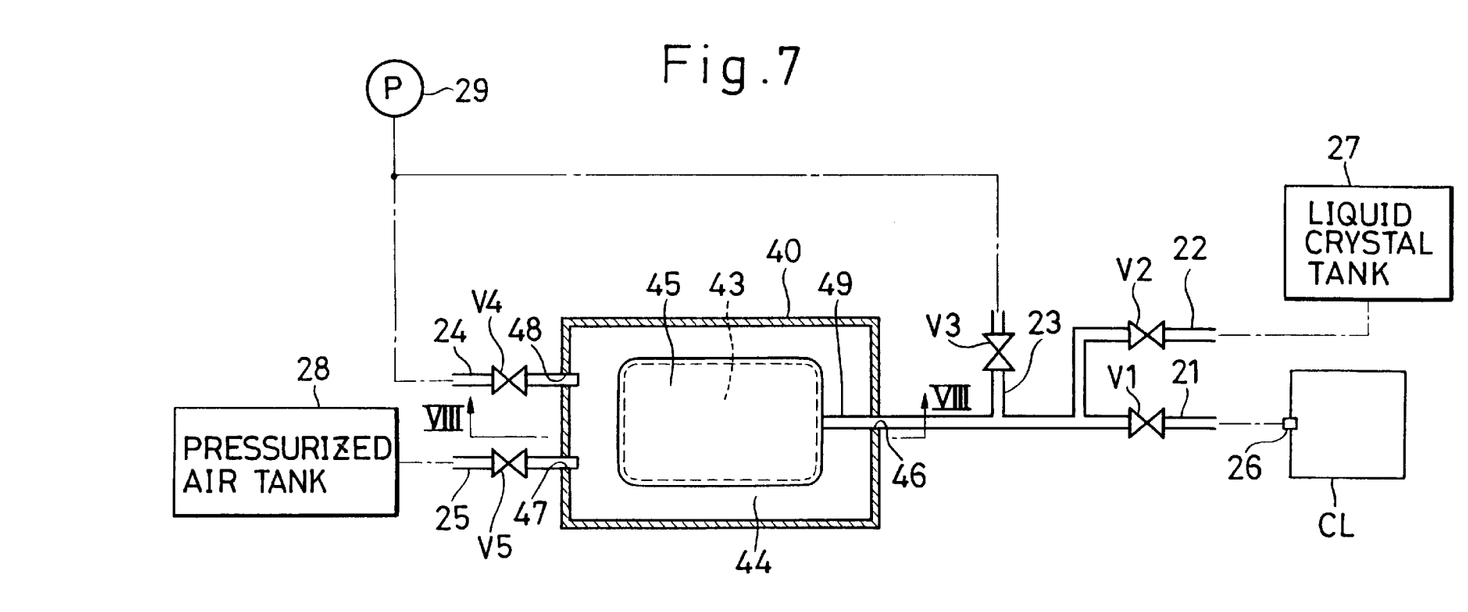
FIG. 7 is a plan sectional view showing the third embodiment of a liquid crystal delivering apparatus according to the present invention.
Figure 8:
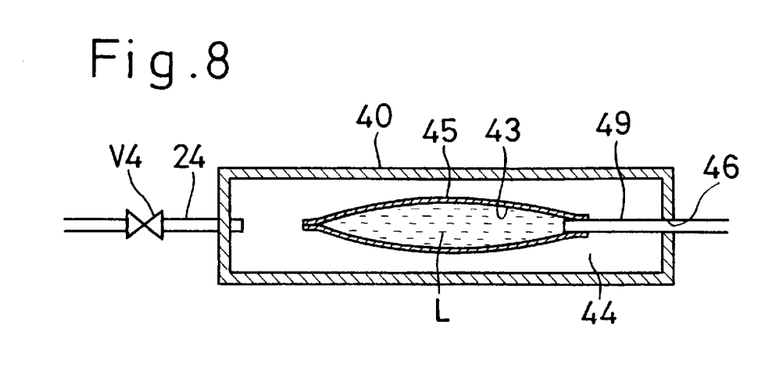
FIG. 8 is a sectional view taken on line VIII—VIII of FIG. 7.

The third embodiment of the present invention will now be described with reference to FIGS. 7 and 8. In this third embodiment, a bag 45 (deformable partition member) is received in the internal space of the closed container 40. This bag 45 is formed by bonding peripheral edges of two thin sheets which are chemically stabilized with respect to the liquid crystal. An internal volume of the bag 45 can be increased and decreased. Especially, since sheets made of expansible material such as fluoro-rubber or the like are used here, the internal volume of the bag 45 can be increased and decreased extensively. The closed container 40 is formed with a first port 46, a second port 47 and a third port 48. A common tube 49 extends through the first port 46. One end of the common tube 49 is connected to the bag 45. The other end of the common tube 49 is connected to the outlet tube 21, the supply tube 22 and the intake tube 23. The second port 47 is connected with the inlet tube 25, whereas the third port 48 is connected with the intake tube 24. An inner space 43 of the bag 45 is provided as a first chamber for reserving a liquid crystal, whereas an outer space 44 of the bag 45 is provided as a second chamber for introducing therein a pressurized air.

With the above-mentioned construction, although the process for removing a gas from the liquid crystal is not executed, the remaining functions are similar to the first embodiment. This will be briefly described. First, the valve V3 is opened to evacuate the inner space 43 of the bag 45 so that its volume will be zero. Then, the valve V3 is closed and the valve V2 is opened to supply the liquid crystal L from the liquid crystal tank 27 to the bag 45. At that time, the valve V4 is also opened to evacuate the outer space 44 of the bag 45 so that the supply of the liquid crystal to the bag 45 is enhanced. Thereafter, the valves V2 and V4 are closed and then the valves V1 and V5 are opened. As a consequence, the pressurized air is introduced into the outer space 44 of the bag 45 to push the liquid crystal L received in the bag 45 so that the liquid crystal L is delivered to the cell CL.

In the third embodiment, the inner space 43 of the bag 45 may be provided as the second chamber for introducing therein the pressurized air, and the outer space 44 of the bag 45 may be provided as the first chamber for reserving the liquid crystal.

Figure 9:
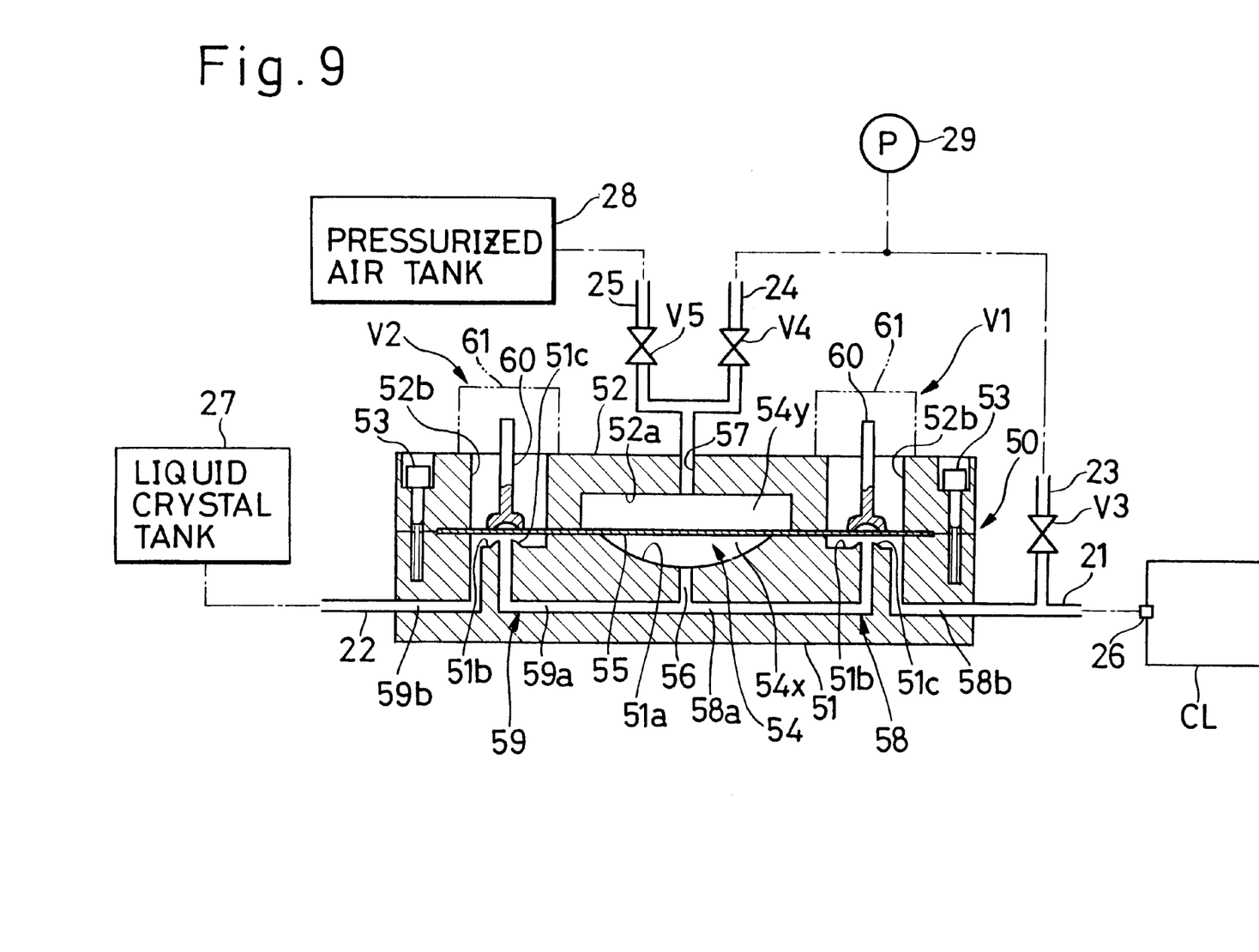
FIG. 9 is a vertical sectional view showing the fourth embodiment of a liquid crystal delivering apparatus according to the present invention.
Figure 10:
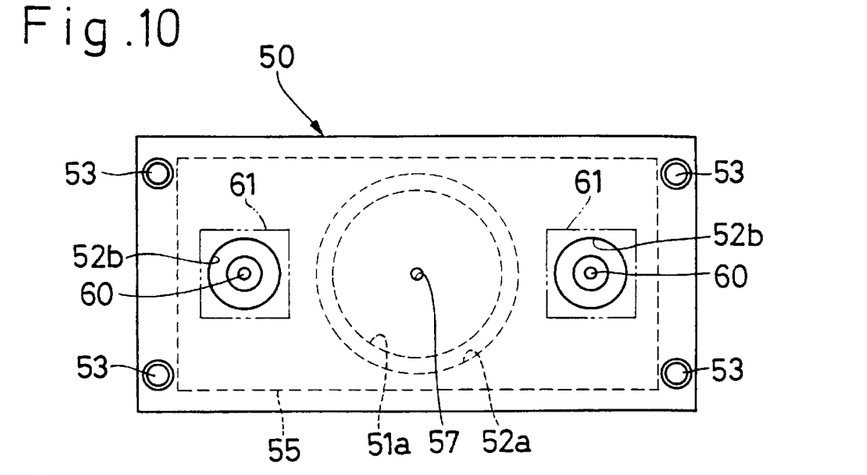
FIG. 10 is a plan view showing the above apparatus.

The fourth embodiment of the present invention will now be described with reference to FIGS. 9 through 12. As best shown in FIG. 9, this liquid crystal delivering apparatus comprises an elongated parallelepiped closed container 50 and a diaphragm 55 (deformable partition member). This closed container 50 comprises a lower half 51 (first half) and an upper half 52 (second half). Those halves 51 and 52 are abuttingly jointed together by bolts 53. Recesses 51a and 52a are formed respectively in central portions of the abutting surfaces of the halves 51 and 52. An internal space 54 of the closed container 50 is formed by the recesses 51a and 52a.

The diaphragm 55 is clamped by the halves 51 and 52. The diaphragm 55 is elastically deformable. Especially, chemically stable material with respect to the liquid crystal is used here, such as fluoro-rubber or the like. The internal space 54 is divided by this diaphragm 55 into a first chamber 54x for reserving the liquid crystal and a second chamber 54y for introducing therein the pressurized air. A first port 56, which is in communication with the fist chamber 54x, is formed in the center of the recess 51a of the lower half 51, whereas a second port 57, which is in communication with the second chamber 54y, is formed in the center of the recess 52a (second recess) of the upper half 52.

An outlet passage 58 is formed in a right-hand portion of the lower half 51 of the closed container 50, whereas a supply passage 59 is formed in a left-hand portion thereof. One ends of the passages 58 and 59 are in communication with the first port 56. The other end of the outlet passage 58 is opened at a right-hand end face of the lower half 51. The other end of the outlet passage 58 is connected to the connector 26 through the outlet tube 21 and also to the vacuum pump 29 through the intake tube 23. The other end of the supply passage 59 is opened at a left-hand end face of the lower half 51 and connected to the liquid crystal tank 27 through the supply tube 22.

The passages 58 and 59 are opened and closed at intermediate parts thereof by the valves V1 and V2, respectively. The valve V1 is located at a right-hand portion of the closed container 50, and the valve V2 is located at a left-hand portion of the closed container 50.

Figure 11:
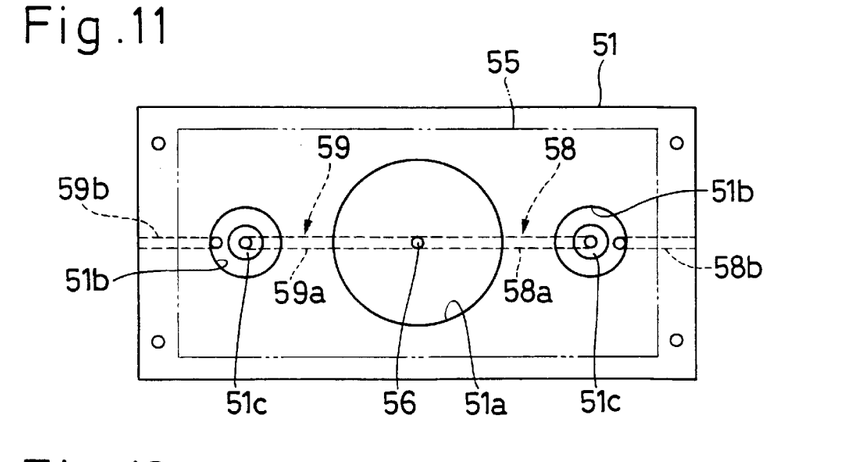
FIG. 11 is a plan view of a lower half of the above apparatus.
Figure 12:
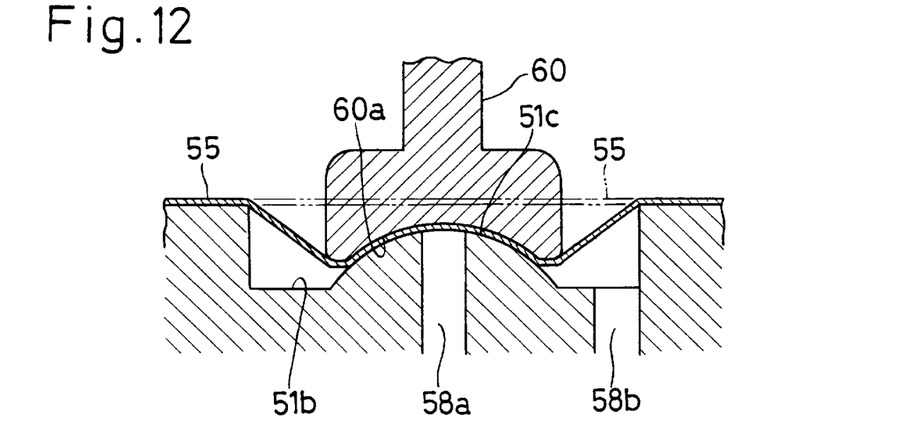
FIG. 12 is an enlarged sectional view showing a closed state of a valve of the above apparatus.

The valve V1 will be described. As shown in FIGS. 9 and 11, an auxiliary recess 51b is formed in an upper surface of a right-hand portion of the lower half 51. This auxiliary recess 51b is formed at a bottom surface thereof with a valve seat 51c having a convex surface. The outlet passage 58 includes a first portion 58a and a second portion 58b. One end of this first portion 58a is in communication with the first port 56 and the other end of the first portion 58a is opened at the center of the valve seat 51. One end of the second portion 58b is opened at a bottom surface of the auxiliary recess 51b away from the valve seat 51c, and the other end is opened at the right-hand surface of the lower half 51. On the other hand, a hole 52b is formed in the upper half 52 at a corresponding location to the auxiliary recess 51b. A valve element 60 is arranged in a vertical posture thereof within the hole 52b. A driving mechanism 61 including, for example, a cylinder or the like, is installed on an upper surface of the upper half 52, so that the valve element 60 is moved upwardly and downwardly by this driving mechanism 61. The valve element 60 is arranged right above the valve seat 51c. As best shown in FIG. 12, a lower surface 60a of the valve element 60 has a concave surface corresponding to the convex surface fthe valve seat 51c.

Since the valve V2 has the same construction, corresponding component parts to those of the valve V1 are denoted by same reference numerals and description thereof is omitted. The supply passage 59 also includes, as in the case with the outlet passage 58, a first portion 59a and a second portion 59b.

The diaphragm 55 extends long in a lateral direction of FIG. 9. The extension portions of the diaphragm 55 close upper end openings of the auxiliary recesses 51b of the valves V1 and V2 in an air-tight manner. A part of the outlet passage 58 is constituted by the right-hand side extension portion of the diaphragm 55 and the right-hand side auxiliary recess 51b. A part of the supply passage 59 is constituted by the left-hand side extension portion of the diaphragm 55 and the left-hand side auxiliary recess 51b.

As shown in FIG. 9, the valve element 60 is faced with the valve seat 51c through the diaphragm 55. When the valve element 60 of the valve V1 is moved downwardly by the driving mechanism 61, it elastically deforms the diaphragm 55 and sits on the valve seat 51c through the diaphragm 55 as shown in FIG. 12. As a consequence, the outlet passage 58 is closed. When the valve element 60 is moved into an upper position and left from the valve seat 51c, the diaphragm 55 is also returned by its own resiliency and causes the outlet passage 58 to be opened. The valve V2 also opens and closes the supply passage 59 in the same manner.

As shown in FIG. 9, the second port 57 is connected, as in the case with the first embodiment, with the pressurized air tank 28 through the inlet tube 25 and also with the vacuum pump 29 through the intake tube 24.

With the above-mentioned construction, first, a preparatory process is executed. Specifically, the valves V3 and V4 are closed and the valves V1 and V2 are opened. In that state, the valve V5 is opened to introduce the pressurized air into the second chamber 54y through the second port 57. By doing this, the diaphragm 55 is brought into generally intimate contact with a surface of the recess 51a. Then, the valve V3 is opened to evacuate the supply passage 59 and the outlet passage 58 and fills the liquid crystal into the supply passage 59 and the outlet passage 58.

Subsequently, a liquid crystal supply process is executed. Specifically, while maintaining the valve V2 in its open position, the valves V1, V3 and V5 are closed and then the valve V4 is opened. By doing this, the interior of the second chamber 54y is evacuated. As a consequence, the diaphragm 55 is drawn upwardly and the volume of the first chamber 54x is increased so that the liquid crystal is supplied into this first chamber 54x.

Subsequently, a liquid crystal delivering process is executed. Specifically, the valves V2 and V4 are closed, and the valve V1 is opened. Then, the valve V5 is opened to introduce the pressurized air into the second chamber 54y. Then, the liquid crystal within the first chamber 54x is pushed by the pressurized air through the diaphragm 55. The liquid crystal thus pressurized is delivered to the cell CL through the outlet passage 58.

After the filling of the liquid crystal into the cell CL is finished and the connector 26 is connected to a new cell CL, the above-mentioned liquid crystal supply process and liquid crystal delivering process are repeated.

Also in the fourth embodiment, the liquid crystal supplied to the first chamber 54x and an air for pressuring this liquid crystal are prevented from directly contacting each other by the diaphragm 55.

In the fourth embodiment, the outlet passage 59 may be connected to the first port 56 and the supply passage 58 may be connected to another port facing with the first chamber 54x.

In the fourth embodiment, in case the pressurized liquid crystal is introduced into the first chamber 54x, the second chamber 52y may be open to the atmosphere and not evaporated. The supply passage and the outlet passage may be replaced by a common passage.

In the above-mentioned first through fourth embodiments, other pressurized gas or a fluid such as oil or the like may be used instead of the pressurized air. The object is not limited to the cell either.

What is claimed is:

1. A liquid crystal delivering apparatus comprising:

a closed container provided with a first port and a second port, said first port being connected to an object to which a liquid crystal is to be delivered;

a pressurized fluid supply source connected to said second port; and a deformable partition member for dividing an internal space of said closed container into a first chamber and a second chamber, said first chamber being provided as a chamber for reserving the liquid crystal and in communication with said first port, said second chamber being in communication with said second port and provided as a chamber for receiving a pressurized fluid from said pressurized fluid supply source;

wherein said closed container includes a first and a second half which are abuttingly connected together, said partition member comprising an elastically deformable diaphragm and clamped between said first and second halves, and wherein said first half is formed with a first recess which co-acts with said diaphragm to define said first chamber and said first port which is in communication with said first recess, and said second half is formed with said second recess which co-acts with said diaphragm to define said second chamber and said second port which is in communication with said second recess and wherein said first half is formed with a delivering passage and a supply passage, one end of said delivering passage being in communication with said first port and the other end being open at an outer surface of said first half, one end of said supply passage being in communication with said first chamber and the other end being opened at the outer surface of said first half, said delivering passage being in communication with said object whereas said supply passage being in communication with said liquid crystal supply source.

2. A liquid crystal delivering apparatus according to claim 1, in which said closed container is provided with a valve for opening and closing said delivering passage and another valve for opening and closing said supply passage, said first half being formed with two auxiliary recesses whereas said second half being formed with holes at locations corresponding to said auxiliary recesses, said two auxiliary recesses constituting parts of said delivering passage and said supply passage respectively, each of said valves including an extension portion of said diaphragm for closing said auxiliary recess, a valve seat formed on a bottom surface of said auxiliary recess, a valve element arranged in said hole of said second half and faced with said valve seat through said diaphragm, and a driving mechanism for moving said valve element between a position where said valve element sits on said valve seat through said diaphragm and a position away from said valve seat, intermediate portions of said delivering passage and said supply passage being opened at said valve seats of said valves, respectively.

3. A liquid crystal delivering apparatus according to claim 1, in which said second chamber is connected with evacuation means for making the pressure within said second chamber negative so that the liquid crystal is introduced into said first chamber from said liquid crystal supply source.

4. A liquid crystal delivering apparatus according to claim 1 wherein said pressurized fluid supply source comprises a pressurized air supply source.

* * * * *